United States Patent [19]

Ishiharada et al.

[11] Patent Number: 5,744,534
[45] Date of Patent: Apr. 28, 1998

[54] LIGHT SCATTERING MATERIAL

[75] Inventors: Minoru Ishiharada, Kodaira; Itsuo Tanuma, Sayama; Kazuo Naito, Kawasaki, all of Japan

[73] Assignee: Bridgestone Corporation, Tokyo, Japan

[21] Appl. No.: 631,130

[22] Filed: Apr. 12, 1996

Related U.S. Application Data

[63] Continuation of Ser. No. 103,714, Aug. 10, 1993, abandoned.

[30] Foreign Application Priority Data

Aug. 10, 1992 [JP] Japan .................... 4-234203
Aug. 10, 1992 [JP] Japan .................... 4-234204

[51] Int. Cl.$^6$ .................................... C08K 3/34
[52] U.S. Cl. .................... 524/442; 524/503; 524/506; 524/507; 524/523; 524/525; 524/533; 524/534; 525/303; 525/305; 525/271
[58] Field of Search ................... 525/305, 271, 525/303; 524/442, 503, 506, 507, 523, 525, 533, 534

[56] References Cited

U.S. PATENT DOCUMENTS 5,004,785  4/1991  Ida et al. .
5,237,004  8/1993  Wu et al. .................... 525/85

FOREIGN PATENT DOCUMENTS

| 0464499 | 1/1992 | European Pat. Off. . |
| 0497506 | 8/1992 | European Pat. Off. . |
| 57-086801 | 5/1982 | Japan . |
| 61-076547 | 4/1986 | Japan . |
| 62-174261 | 1/1987 | Japan . |
| 6480910 | 9/1987 | Japan . |
| 6480912 | 9/1987 | Japan . |
| 2194058 | 1/1989 | Japan . |
| 1315466 | 6/1989 | Japan . |
| 1172801 | 7/1989 | Japan . |
| 4156404 | 10/1990 | Japan . |
| 1290521 | 9/1972 | United Kingdom . |

*Primary Examiner*—Melvyn I. Marquis
*Attorney, Agent, or Firm*—Sughrue, Mion, Zinn, Macpeak & Seas, PLLC

[57] ABSTRACT

A light scattering material is prepared by mixing with and dispersing in a transparent elastomer matrix particles of a transparent material. The matrix has a Tg of lower than room temperature and the transparent material has a different index of refraction form the matrix.

3 Claims, No Drawings

LIGHT SCATTERING MATERIAL

This is a continuation of application Ser. No. 08/103,714, filed Aug. 10, 1993 now abandoned.

BACKGROUND OF THE INVENTION

1. Field of the Invention

This invention relates to a material for effectively scattering light, especially a light scattering material for use in combination with a light transmitting hose and a method for preparing the same.

2. Prior Art

Known light scattering materials for effectively transmitting and scattering light include light scattering members in the form of plastic optical fibers, illuminators and light scattering materials of metal dispersion systems.

One typical light scattering member of plastic optical fiber is prepared by processing one or more plastic optical fibers into a ribbon form and forming scratches on the outer surface of the ribbon as by filing, whereby light incident on one end of the ribbon (fiber or fibers) emanates and scatters from the ribbon through such scratches. This light scattering member, however, has scattering properties largely dependent on the distribution of scratches and produces a greatly varying quantity of scattering light. To increase the quantity of scattering light, the quantity of incident light must be increased. This, in turn, can be achieved, for example, by increasing the diameter of a fiber. The larger the diameter, the less flexible become plastic optical fibers. The upper limit of diameter is about 3 mm in the state of the art. This limits the quantity of incident light and the quantity of scattering light.

The illuminators are disclosed in Japanese Patent Application Kokai (JP-A) Nos. 80910/1989 and 80912/1989 as a light scattering tubing using a liquid core. This light scattering tubing includes a cladding in the form of a hollow flexible tubular member filled with a core liquid having a higher index of refraction than the cladding, opposite openings of the cladding being closed by window members. Light is incident at one or both ends of the light scattering tubing whereby light emanates due to scattering at the core-cladding interface and/or Rayleigh scattering in the core liquid. This illuminator can have a larger diameter with no sacrifice of flexibility. A large effective light receiving area allows for efficient incidence and emergence of light. Economy is another advantage.

Irrespective of these advantages, the above-mentioned illuminator has a possibility of rupture or cracking of the cladding and resultant leakage of the core liquid during use, leading to a substantial loss of light emission. Light emission by scattering at the core-cladding interface and/or Rayleigh scattering in the core liquid is generally accompanied by a low light intensity, and a powerful light source is required in order to increase a light emission quantity.

The light scattering materials of metal dispersion system are prepared by dispersing metallized particles (for example, glass beads metallized by evaporation of metals such as aluminum), metal foil flakes or metal particles in transparent resins. Light scatters by way of light reflection at metal surfaces. However, metals generally have a reflectance of about 90 to 95%, and light loses its intensity after several reflections. Since a number of reflections are repeated until light exits the light scattering material, the light is substantially reduced in intensity when appearing as scattering light. As to scattering directions, there mostly occurs back scattering and it is difficult to illuminate an entire object over a wide range.

SUMMARY OF THE INVENTION

Therefore, an object of the present invention is to provide a light scattering material which is flexible, easy to handle, easy to process inexpensive to manufacture, and highly efficient to scatter light. Another object is to provide a method for preparing the same.

The inventors have found that by mixing with and dispersing in a transparent elastomer matrix having a glass transition temperature of lower than room temperature, a transparent material having a different index of refraction from the matrix; by mixing with and dispersing in a monomer which is to polymerize into a transparent elastomer having a glass transition temperature of lower than room temperature, a transparent material having a different index of refraction from the transparent elastomer, and causing the monomer to polymerize; or by mixing with and dispersing in a transparent elastomer matrix having a glass transition temperature of lower than room temperature, a monomer which is to polymerize into a polymer having a different index of refraction from the transparent elastomer, and causing the monomer to polymerize; there is obtained a light scattering material comprising a transparent elastomer matrix having a glass transition temperature of lower than room temperature in which particles of a transparent material having a different index of refraction from the matrix are dispersed. Since this light scattering material has an optically inhomogeneous sea-island structure, light entering the light scattering material is scattered at the interface between transparent materials having different indexes of refraction due to refraction and reflection of light without a substantial loss by absorption because the light scattering material is entirely formed of the transparent materials. Thus incident light is efficiently scattered. Since the light scattering material is mainly formed of the elastomer matrix having a glass transition temperature of lower than room temperature, it is fully flexible and easy to handle and process at room temperature.

By the term particles it is meant that the transparent material is of spherical, ellipsoidal, rod, plate and any other desired shape. Also the term "lower than room temperature" is used as inclusive of room temperature.

We have also found that by polymerizing at least two distinct monomers which have different reactivity (e.g., reaction rate) and are to form transparent polymers having different indexes of refraction, at least one polymer forming an elastomer matrix having a glass transition temperature of lower than room temperature, there is obtained a light scattering material consisting of optically inhomogeneous transparent polymers. Since the subordinate monomer which is mixed with the base monomer forming a matrix has different reactivity (e.g., reaction rate) from the base monomer, the subordinate monomer undergoes substantial homopolymerization or block copolymerization with the base monomer. The respective monomers form cohesion structures nucleated on respective polymerization chains. Light entering such a light scattering material is scattered at the interface between the cohesion structures having different indexes of refraction due to refraction and reflection of light, but without a loss by absorption because the light scattering material is entirely formed of transparent materials. Thus incident light is efficiently scattered. Since the light scattering material is mainly formed of the elastomer matrix having a glass transition temperature of lower than room temperature, it is fully flexible and easy to handle and process at room temperature.

According to a first aspect of the invention, there is provided a light scattering material comprising a transparent elastomer matrix and particles of a transparent material dispersed therein. The transparent elastomer matrix has a glass transition temperature of lower than room temperature and the particulate transparent material has a different index of refraction from the matrix.

The light scattering material defined above can be prepared in various ways.

In a second aspect, a light scattering material is prepared by mixing with and dispersing in a transparent elastomer matrix particles of a transparent material.

In a third aspect, a light scattering material is prepared by mixing with and dispersing in a monomer a transparent material and causing the monomer to polymerize. The monomer is to polymerize into a transparent elastomer having a glass transition temperature of lower than room temperature. The transparent material has a different index of refraction from the transparent elastomer.

In a fourth aspect, a light scattering material is prepared by mixing with and dispersing in a transparent elastomer matrix a monomer and causing the monomer to polymerize. The transparent elastomer has a glass transition temperature of lower than room temperature. The monomer is to polymerize into a polymer having a different index of refraction from the transparent elastomer.

In a fifth aspect, a light scattering material is prepared by polymerizing at least two distinct monomers which have different reactivity and are to form transparent polymers having different indexes of refraction, at least one polymer forming an elastomer matrix having a glass transition temperature of lower than room temperature, thereby forming a light scattering material consisting of optically inhomogeneous transparent polymers.

DETAILED DESCRIPTION OF THE INVENTION

The light scattering material of the invention includes a transparent elastomer matrix and particles of a transparent material dispersed therein. The transparent elastomer matrix has a glass transition temperature (Tg) of lower than room temperature (RT) and the particulate transparent material has a different index of refraction from the matrix.

The transparent elastomer matrix may be selected from transparent polymers having a Tg of lower than room temperature (Tg$\leq$RT). Exemplary polymers include polyvinyl acetate, polyethylene-vinyl acetate copolymers, polyethylene-polyvinyl alcohol copolymers, polyisoprene rubber, polybutadiene rubber, styrene-butadiene copolymers, styrene-butadiene-styrene block copolymer rubber, styrene-butadiene block copolymer rubber, styrene-isoprene-styrene block copolymer rubber, styrene-isoprene block copolymer rubber, styrene-ethylene-butylene-styrene copolymer rubber, butyl rubber, halogenated butyl rubber, chloroprene rubber, acrylic rubber, EPDM, acrylonitrile-butadiene copolymers, fluoride rubber, thermoplastic fluoride rubber, silicone rubber, polybutene, and acrylate ester polymers and copolymers. Preferred polymers are acrylate ester polymers and copolymers having Tg$\leq$RT because of transparency. Examples of the alcohol residue constituting the acrylate ester include alkyl radicals such as methyl, ethyl, butyl, propyl, stearyl, and lauryl radicals, and 2-ethylhexyl, cyclohexyl, tetrahydrofurfuryl, aminoethyl, 2-hydroxyethyl, 3-hydroxypropyl, 3-chloro-2-hydroxypropyl, and trifluoroethyl radicals. Also useful are esters of acrylic acid with polyfunctional alcohols such as ethylene glycol, triethylene glycol, polyethylene glycol, and trimethyolpropane. An additional mono- or polyfunctional monomer which itself forms a polymer having Tg>RT may be used in combination with the above-mentioned monomer if the resulting copolymer has Tg$\leq$RT. Exemplary additional monomers are methacrylate ester derivatives which may have alcohol residues as mentioned above. Also useful are polymerizable vinyl monomers including styrene, divinyl-benzene, α-methylstyrene, vinyl acetate, methyl vinyl ketone, phenyl vinyl ketone, and vinyl benzoate. Even a polymer having Tg>RT can be used as the matrix in the practice of the invention insofar as it has been dissolved and swollen in a plasticizer, oil or solvent so as to have Tg$\leq$RT.

Dispersed in the transparent elastomer matrix are transparent particles having a different index of refraction from the transparent elastomer matrix. The dispersion has an optically inhomogeneous structure and constitutes a light scattering material. The transparent elastomer has an index of refraction ($n_1$) and the particles or agglomerates of transparent material have an index of refraction ($n_2$). Preferably the difference between $n_1$ and $n_2$ is at least 0.005, more preferably at least 0.01 where luminance is required for the light scattering material, most preferably at least 0.03 where higher luminance is required. Light scattering would be insufficient if the difference is less than 0.005. The upper limit of the difference between $n_1$ and $n_2$ is preferably 2. If the difference is more than 2, light scattering may be too strong and compatibility between the matrix and the particles may be worsened, resulting in insufficient light scattering materials. Either one of $n_1$ and $n_2$ may be higher than the other although it is preferred that $n_1$ be higher than $n_2$.

The transparent material particles to be dispersed in the transparent elastomer matrix may be either inorganic or organic materials. Examples of the inorganic material include powders, fibers, and beads of quartz glass, multi-component glass, sapphire, and quartz. Examples of the organic material include polyamides, polystyrene, polymethyl methacrylate, polycarbonate, polyvinyl chloride, polyvinylidene chloride, polyvinyl acetate, polyethylenevinyl acetate copolymers, polyvinyl alcohol, polyethylenepolyvinyl alcohol copolymers, fluoride resin, silicone resin, polyisoprene rubber, polybutadiene rubber, styrene-butadiene copolymers, butyl rubber, halogenated butyl rubber, chloroprene rubber, acrylic rubber, EPDM, acrylonitrile-butadiene copolymers, fluoride rubber, silicone rubber, ABS resin, acrylonitrile-styrene copolymer resin, styrene-butadiene copolymers, acrylonitrile-EPDM-styrene terpolymers, styrene-methyl methacrylate copolymers, methacrylic resin, epoxy resin, polymethyl pentene, allyl diglycol carbonate resin, spirane resin, amorphous polyolefin, polyallylate, polysulfone, polyallyl sulfone polyether sulfone, polyether imide, polyimide, polyethylene terephthalate, diallyl phthalate, polyester carbonate, paraffin, polybutene, and polyisobutylene, in powder, fiber or beads form.

In dispersing the transparent material in the transparent elastomer matrix, the transparent material in bulk or liquid form may be dispersed in the transparent elastomer matrix, for example, by kneading or milling. The liquid transparent material may be selected from, inorganic or organic transparent liquids, for example, silicone oil, fluorinated oil, liquid paraffin, ethylene glycol, polybutene, and polyisobutylene. The transparent material particles have a size (the distance covered by light passing along the incident axis) which is preferably greater than the wavelength of incident light by a factor of 0.1 to 50, more preferably 0.5 to 20, most preferably 2 to 10. If the particle size is less than 0.1 times the wavelength of incident light, there is a likelihood that Rayleigh scattering becomes predominant so that light scattering becomes weaker and is affected by the light wavelength. If the particle size is more than 50 times the wavelength of incident light, the transparent material particles tend to agglomerate, detracting from light scattering capability.

The amount of the transparent material particles blended is preferably about 0.005 to 50 parts, especially 0.01 to 10 parts by weight per 100 parts by weight of the transparent elastomer matrix.

The light scattering material mentioned above may be prepared by mixing with and dispersing in a transparent elastomer matrix having $Tg \leq RT$, particles of a transparent material having a different index of refraction from the matrix. Mixing techniques used herein include mixing by means of a mixer or extruder, solvent casting, diffusion by swelling or the like.

Also, the light scattering material may be prepared by mixing with and dispersing in a monomer which is to polymerize into a transparent elastomer having $Tg \leq RT$, a transparent material having a different index of refraction from the transparent elastomer, and causing the monomer to polymerize. Alternatively, the light scattering material may be prepared by mixing with and dispersing in a transparent elastomer matrix having $Tg \leq RT$, a monomer which is to polymerize into a polymer having a different index of refraction from the transparent elastomer, and causing the monomer to polymerize. The monomer used herein may be a single monomer or a mixture of two or more monomers capable of forming a copolymer. Polymerization of the monomer can be effected in a conventional manner.

In order to improve its heat resistance and chemical resistance, the light scattering material is preferably crosslinked, if desired, for fixing its dispersed state. Crosslinking may be achieved by heat, ultraviolet radiation, electron beams, and gamma-radiation. Particles or agglomerates of transparent material or transparent elastomer matrix may be crosslinked prior to dispersion. Alternatively, a light scattering material is formed and then crosslinked.

The method of preparing a light scattering material is not limited to the above-mentioned ones. For example, it is acceptable to polymerize two or more monomers having different reactivity such as different reaction rates. More specifically, at least two distinct monomers which have different reactivity and are to form transparent polymers having different indexes of refraction are polymerized, at least one polymer (resulting from a base monomer) forming an elastomer matrix having a glass transition temperature of lower than room temperature. There is formed a light scattering material consisting of optically inhomogeneous transparent polymers.

The base monomer which forms a matrix of the light scattering material may be selected from monomers which polymerize into transparent elastomers or polymers having $Tg \leq RT$. The polymer may be either a homopolymer or a copolymer. Then the monomer used herein may be a single monomer or a mixture of two or more monomers capable of forming a copolymer or transparent elastomer.

Preferred base monomers are acrylate esters which form polymers (including homopolymer and copolymers) having $Tg \leq RT$ because of transparency. Examples of the alcohol residue constituting the acrylate ester include alkyl radicals such as methyl, ethyl, butyl, propyl, stearyl, and lauryl radicals, and 2-hexyl, cyclohexyl, tetrahydrofurfuryl, amino-ethyl, 2-hydroxyethyl, 3-hydroxypropyl, 3-chloro-2-hydroxypropyl, and trifluoroethyl radicals. Also useful are esters of acrylic acid with polyfunctional alcohols such as ethylene glycol, triethylene glycol, polyethylene glycol, and trimethyolpropane. An additional mono- or polyfunctional monomer which itself forms a polymer having $Tg > RT$ may be used in combination with the base monomer if the resulting copolymer has $Tg \leq RT$. Exemplary additional monomers are methacrylate ester derivatives which may have alcohol residues as mentioned above. Also useful are polymerizable vinyl monomers including styrene, divinylbenzene, $\alpha$-methylstyrene, vinyl acetate, methyl vinyl ketone, phenyl vinyl ketone, and vinyl benzoate.

A second monomer is polymerized concurrently with the base monomer to form an optically inhomogeneous structure with the polymer matrix resulting from the base monomer. The second monomer which forms a polymer having an index of refraction different from the polymer matrix may be any desired one, preferably acrylic ester derivatives and methacrylic ester derivatives as mentioned above for the base monomer. The polymer having an index of refraction different from the polymer matrix includes homopolymers and copolymers. The copolymers include those with the base monomer. The second monomer should be selected from those monomers that are different from the base monomer in reactivity such as reaction rate and when polymerized, form an optically inhomogeneous structure with the polymer matrix resulting from the base monomer.

The polymeric matrix resulting from the base monomer has an index of refraction ($n_1$) and the polymer which results from the second monomer to form an optically inhomogeneous structure with the matrix has an index of refraction ($n_2$). Preferably the difference between $n_1$ and $n_2$ is at least 0.005, more preferably at least 0.01 where luminance is required for the light scattering material, most preferably at least 0.03 where higher luminance is required. Light scattering would be insufficient if the difference is less than 0.005. The upper limit of the different is preferably 2. Either one of $n_1$ and $n_2$ may be higher than the other although it is preferred that $n_1$ be higher than $n_2$. Therefore, the base and second monomers should be selected by taking into account such differential index of refraction.

In the practice of the invention, the monomers are polymerized by any desired technique, for example, heat polymerization, photo-polymerization, and polymerization by exposure to electron beams, gamma radiation and plasma.

In the case of heat polymerization, conventional well-known catalysts may be used in suitable amounts. Exemplary catalysts include organic peroxides, such as 2,5-dimethylhexane-2,5-dihydroperoxide, 2,5-dimethyl-2,5-di (t-butylperoxy)hexane-3, di-t-butyl peroxide, t-butylcumyl peroxide, 2,5-dimethyl-2,5-(t-butylperoxy)hexane, dicumyl peroxide, $\alpha,\alpha'$-bis(t-butylperoxyiso-propyl)benzene, n-butyl, 4,4-bis(t-butyl-peroxy)valerate, 2,2-bis(t-butylperoxy)butane, 1,1-bis(t-butylperoxy)cyclohexane, 1,1-bis(t-butylperoxy)-3,3,5-trimethylcyclo-hexane, t-butylperoxybenzoate, and benzoyl peroxide; azo compounds such as azobisisobutyronitrile and azobiscyclohexane carbonitrile; and persulfates such as potassium persulfate, sodium persulfate and ammonium persulfate.

Catalysts are also used for photo-polymerization. Useful are the catalysts which generate radicals directly or indirectly upon exposure to light, for example, benzoin, benzophenone, benzoin methyl ether, benzoin ethyl ether, benzoin propyl ether, benzoin isobutyl ether, dibenzyl, 5-nitroacenaphthene, hexachlorocyclopentadiene, para-nitrodiphenyl, para-nitroaniline, 2,4,6-trinitroaniline, 1,2-benzanthraquinone, and 3-methyl-1,3-diaza-1,9-benzanthrone.

Polymerization by exposure to electron beams, gamma rays or plasma proceeds without a catalyst.

Where the base and second monomers are polymerized, 0.005 to 50 parts, especially 0.01 to 10 parts by weight of the second monomer is preferably used per 100 parts by weight of the base monomer.

The light scattering material of the invention is required to have an optically inhomogeneous structure, for example, a structure having a disperse phase of spherical, ellipsoidal, rod, plate or other shape dispersed in a matrix in a sea-island fashion and a lamella structure having plates spaced by matrix layers.

In order to improve its heat resistance and chemical resistance, the light scattering material is preferably crosslinked, if desired, for fixing its dispersed state. Crosslinking may be achieved by heat, ultraviolet radiation, electron beams, and gamma-radiation.

The light scattering material of the invention may be formed into any desired shape including fiber, rod, film, plate, lens, pipe, wedge, cone and dome shapes. In either form, it can be used in combination with a light transmitting hose or optical waveguide.

The light scattering material of the invention may be used in a variety of applications, typically as illuminators and light-emergent members in automobiles, for example, as map lamps, room lamps, and spot lights at the ceiling, trunk room lights, dashboard lights (e.g., meter, gauge and switch lights), glove compartment lights, ashtray lights, key hole lights, license plate lights (direct and back light), emblem lights, antenna pole lights, corner pole lights, bumper and side molding linear illuminators. Light from a special lamp or the existing light source such as a head light or sidemarker light in the automobile is guided through a light transmitting hose to a shape of the light scattering material of the invention where scattering light emerges outside.

In addition, the invention is also applicable as plane lights in advertising towers, panels, luminous walls, ceilings and business machines (as back light), and as rod lights built in closet hangers, handrails, and bicycle frames as well as desk and floor lamps. Other useful applications include marine hoses, emergency guide lines, yardage indicators in golf courses, and line markers in pools and athletic fields. When used for scattering of ultraviolet radiation, the invention is applicable as incubating lamps in biological culture tanks and for sterilization and purification of water in ponds, pools and water filtration plants.

EXAMPLE

Examples of the present invention are given below by way of illustration and not by way of limitation. All parts are by weight.

Example 1

| | |
|---|---|
| Methylphenylsilicone rubber (index of refraction 1.50) | 100 parts |
| Glass beads (diameter 10 μm, index of refraction 1.60) | 5 parts |

These components were mixed in a mixer and extrusion molded into a rod of 10 mm in diameter. Light was introduced into the light scattering rod at one end to find that light scattered uniformly from the rod. This light scattering rod was fully flexible and could be bent to any desired form.

Example 2

| | |
|---|---|
| Methylphenylsilicone rubber (index of refraction 1.50) | 100 parts |
| Polystyrene (index of refraction 1.60) | 5 parts |

These components were mixed in a mixer and extrusion molded into a rod of 10 mm in diameter. Light was introduced into the light scattering rod at one end to find that light scattered uniformly from the rod. This light scattering rod was fully flexible and could be bent to any desired form.

Example 3

| | |
|---|---|
| n-butyl acrylate | 100 parts |
| Polystyrene | 0.2 parts |
| Benzoyl peroxide | 0.2 parts | n-butyl acrylate (acrylic monomer) which was to polymerize into a homopolymer having $Tg \leq RT$ and a polystyrene having an index of refraction different from that of the acrylic monomer were mixed and dispersed. The resulting liquid mixture was blended with benzoyl peroxide. The liquid mixture was allowed to polymerize at 90° C. for 96 hours.

Example 4

The procedure of Example 3 was repeated except that 2-ethylhexyl acrylate was used instead of n-butyl acrylate and polymethyl methacrylate was used instead of polystyrene.

Example 5

The procedure of Example 3 was repeated except that stearyl methacrylate was used instead of n-butyl acrylate.

Example 6

The procedure of Example 3 was repeated except that lauryl methacrylate was used instead of n-butyl acrylate and polystyrene oligomer was used instead of polystyrene.

Example 7

| | |
|---|---|
| Methylphenylsilicone rubber (index of refraction 1.50) | 100 parts |
| Methyl methacrylate | 0.1 parts |
| Azobisisobutyronitrile | 0.2 parts |

These components were milled in a roll mill and extrusion molded into a rod of 10 mm in diameter. The rod was exposed to a UV lamp to polymerize methyl methacrylate.

Example 8

Upon exposure to electron beams, the light scattering materials prepared in Examples 1 to 7 converted into solvent-insoluble ones. The materials remained substantially unchanged from those prior to the electron exposure with respect to flexibility and light scattering ability.

The light scattering materials prepared in Examples 3 to 7 were shaped into rods of 10 mm in diameter. Light was introduced into the rods at one end to find that light uniformly scattered from the rods over a length of 1 mm.

These light scattering rods were fully flexible and could be bent to any desired form.

Example 9

| | |
|---|---|
| Butyl acrylate (M1) | 100 parts |
| Cyclohexyl methacrylate (M2) | 25 parts |
| n-butylmercaptan | 0.2 parts |
| Azobisisobutyronitrile | 0.2 parts |

A liquid mixture of these components, that is, a mixture primarily containing an acrylic monomer (M1) which was to polymerize into a homopolymer having Tg≦RT and another monomer (M2) having a different index of refraction and a different reaction rate from those of the acrylic monomer was allowed to polymerize at 70° C. for 96 hours.

Example 10

The polymerization procedure of Example 9 was repeated except that 2-ethylhexyl acrylate was used as M1 and cyclohexyl methacrylate was used as M2.

Example 11

The polymerization procedure of Example 9 was repeated except that stearyl methacrylate was used as M1 and trimethylolpropane trimetharylate was used as M2.

Example 12

The polymerization procedure of Example 9 was repeated except that lauryl methacrylate was used as M1 and trimethylolpropane trimethacrylate was used as M2.

The light scattering materials prepared in Examples 9 to 12 were shaped into rods of 10 mm in diameter. Light was introduced into the rods at one end to find that light uniformly scattered from the rods over a length of 1 mm. These light scattering rods were fully flexible and could be bent to any desired form.

Upon exposure to electron beams, the light scattering materials prepared in Examples 9 and 10 converted into solvent-insoluble ones. The materials remained substantially unchanged from those prior to the electron exposure with respect to flexibility and light scattering ability.

According to the present invention, there is obtained a light scattering material which is flexible, easy to handle and process, efficient to scatter light and suitable for use with a light transmitting hose. The light scattering material can be simply manufactured at low cost.

Although some preferred embodiments have been described, many modifications and variations may be made thereto in the light of the above teachings. It is therefore to be understood that within the scope of the appended claims, the invention may be practiced otherwise than as specifically described.

We claim:

1. A light scattering material comprising a non-crosslinked transparent elastomer matrix having a glass transition temperature of room temperature or lower, and particles of a transparent material dispersed therein having a different index of refraction from the matrix, wherein the difference in index of refraction between the transparent elastomer matrix and the particles of the transparent material is at least 0.03, wherein the particles of the transparent material have a size greater than the wavelength of incident light by a factor of 2 to 10, the amount of the transparent material particles blended is 0.01 to 10 parts by weight per 100 parts by weight of the transparent elastomer matrix, and said transparent elastomer matrix is selected from the group consisting of an acrylate ester polymer and an acrylate ester copolymer;

wherein said acrylate ester copolymer comprises an acrylate ester monomer and a monomer selected from the group consisting of a methacrylate ester, styrene, α-methyl styrene, vinyl acetate, methyl vinyl ketone, phenyl vinyl ketone and vinyl benzoate monomer; and wherein said acrylate ester polymer, said acrylate ester monomer and said methacrylate ester contain a substituent selected from the group consisting of a methyl, ethyl, butyl, propyl, stearyl, lauryl, 2-ethylhexyl, cyclohexyl, tetrahydrofurfuryl, aminoethyl, 2-hydroxyethyl, 3-hydroxypropyl, 3-chloro-2-hydroxypropyl, and trifluoroethyl radical.

2. The light scattering material of claim 1, wherein the particles of said transparent material comprise an inorganic material selected from the group consisting of quartz glass, multicomponent glass, sapphire and quartz.

3. The light scattering material of claim 1, wherein the particles of said transparent material comprise an organic material selected from the group consisting of polyamides, polystyrene, polymethyl methacrylate, polycarbonate, polyvinyl chloride, polyvinylidene chloride, polyvinyl acetate, polyethylenevinyl acetate copolymers, polyvinyl alcohol, polyethylenepolyvinyl alcohol copolymers, fluoride resin, silicone resin, polyisoprene rubber, polybutadiene rubber, a styrene-butadiene copolymer, butyl rubber, halogenated butyl rubber, chloroprene rubber, acrylic rubber, EPDM, an acrylonitrile-butadiene copolymer, fluoride rubber, silicone rubber, acrylonitrile-butadiene-styrene resin, acrylonitrile-styrene copolymer resin, a styrene-butadiene copolymer, an acrylonitrile-EPDM-styrene terpolymer, a styrene-methyl methacrylate copolymer, methacrylic resin, epoxy resin, polymethyl pentene, allyl diglycol carbonate resin, spirane resin, amorphous polyolefin, polyallylate, polysulfone, polyallyl sulfone polyether sulfone, polyether imide, polyimide, polyethylene terephthalate, diallyl phthalate, polyester carbonate, paraffin, polybutene, and polyisobutylene.

* * * * *